United States Patent [19]

Durio

[11] Patent Number: 4,951,397

[45] Date of Patent: Aug. 28, 1990

[54] PARKING SCALE

[76] Inventor: Charles K. Durio, 6445 Shady Brook La., Apt. 2346, Dallas, Tex. 75206

[21] Appl. No.: 178,568

[22] Filed: Apr. 7, 1988

[51] Int. Cl.[5] .......... B43L 7/00; G01B 3/02

[52] U.S. Cl. .......... 33/494; 33/483

[58] Field of Search .......... 33/483, 487, 492, 493, 33/494, 476, 565, 566, 1 G

[56] References Cited

U.S. PATENT DOCUMENTS

| | | | |
|---|---|---|---|
| 787,974 | 4/1905 | Clark | 33/494 |
| 857,208 | 6/1907 | Schoen | 33/494 |
| 1,105,809 | 8/1914 | McAll | 33/494 |
| 2,486,748 | 11/1949 | Koenig | 33/494 |
| 2,504,251 | 4/1950 | Coffey | 33/484 |
| 2,694,864 | 11/1954 | Romer | 33/565 |
| 3,664,028 | 5/1972 | Smith | 33/565 |
| 4,007,542 | 2/1977 | Bergendorff | 33/432 |
| 4,117,313 | 9/1978 | Vincent | 33/1 SD |

FOREIGN PATENT DOCUMENTS

| | | | |
|---|---|---|---|
| 1231153 | 4/1960 | France | 33/566 |
| 418177 | 2/1967 | Switzerland | 33/566 |

*Primary Examiner*—William A. Cuchlinski, Jr.
*Assistant Examiner*—Patrick R. Scanlon
*Attorney, Agent, or Firm*—Ross, Howison, Clapp & Korn

[57] ABSTRACT

A parking scale for use by architects, planners and engineers comprising indicia establishing one-to-one correspondence with parking spaces of conventional width when drawn to a scale used to prepare a conventional scale drawing.

3 Claims, 1 Drawing Sheet

PARKING SCALE

TECHNICAL FIELD OF THE INVENTION

This invention relates to a drafting aid, and more particularly, to an apparatus comprising scales adapted to directly lay out parking spaces on site plan drawings.

BACKGROUND OF THE INVENTION

Architects, planners and engineers preparing site plan drawings of developments comprising large parking areas have not heretofore had a tool adapted for use in conveniently and directly marking off parking spaces on such drawings. Site plans for developments such as office parks, shopping centers, malls, parking garages, apartments, and the like, having hundreds or thousands of parking places, can be very tedious to draw if the architect must repeatedly count off the number of increments required for a standard parking space on a conventional architect's scale. An apparatus is also needed that will permit an architect to quickly and conveniently mark off nine foot wide parking spaces on scale drawings prepared at different scales such as one inch equals 20, 30, 40, 50, 60, 100 or 200 feet.

A calculator for use in laying out angled parking stalls in parking lots has previously been disclosed in U.S. Pat. No. 4,117,313. This device, however, does not comprise scales as disclosed herein and is not similarly useful to an architect.

SUMMARY OF THE INVENTION

According to the present invention, an apparatus is provided that comprises a plurality of scales bearing indicia that define increments which directly correspond to the width of conventional nine foot wide parking spaces on site plans or other drawings prepared according to the conventional drawing scales frequently used by architects.

According to one embodiment of the invention, apparatus is provided that comprises four linear scale surfaces, each surface further comprising indicia defining increments corresponding directly to the width of adjacent, side-by-side nine foot wide parking spaces on site plans drawn to a specified scale or scales normally used by architects in preparing such drawings.

According to another embodiment of the invention, a parking scale is provided that comprises a plurality of surfaces, each of which bears indicia defining increments that correspond directly to the spacing or conventional automobile parking spaces when drawn to a particular scale normally employed by architects in making such drawings. Each set of indicia is preferably separately labelled or otherwise identified to facilitate use of that particular set of indicia on drawings prepared according to a particular corresponding drawing scale. Thus, a parking scale as disclosed herein having an edge marked with indicia corresponding to the width of conventional site-by-side parking spaces when drawn at a scale corresponding to one inch equals 100 feet would desirably bear legends identifying the entire apparatus as a parking scale (or equivalent wording) and identifying that set of indicia on that particular edge by 1:100. Additionally, the indicia along that edge should be labelled at appropriate intervals to establish one-to-one correspondence between the number of indicia along the edge and the cumulative number of parking spaces marked off along that edge when using that scale.

According to another embodiment of the invention, a parking scale is provided that comprises at least one edge bearing spaced indicia, such indicia being spaced apart so as to establish one-to-one correspondence between such indicia and parking spaces of conventional width on a site plan prepared according to a specified scale.

According to another embodiment of the invention, a parking scale is provided that comprises a plurality of edges bearing spaced indicia that define increments that establish one-to-one correspondence with the width of conventional parking spaces drawn side-by-side on a site plan according to a particular scale.

According to another embodiment of the invention, the subject parking scale can comprise at least one edge having two or more distinguishable sets of spaced indicia, each distinguishable set of indicia corresponding to an array of parking spaces of conventional width drawn at a scale different from that for the other set of indicia.

According to another embodiment of the invention, a parking scale is provided that, like a conventional ship's curve employed by architects, can be marked with indicia to provide one-to-one correspondence between the indica and side-by-side parking spaces drawn according to a particular scale in a curvilinear rather than linear array.

The construction and use of the apparatus of the invention will be further understood upon reading the following detailed description of the invention with reference to the accompanying drawings.

BRIEF DESCRIPTION OF THE DRAWINGS

The apparatus of the invention is further described and explained in relation to the following drawings in which like reference numerals are used to designate like parts in all figures.

DETAILED DESCRIPTION OF THE PREFERRED EMBODIMENTS

Figure 4:
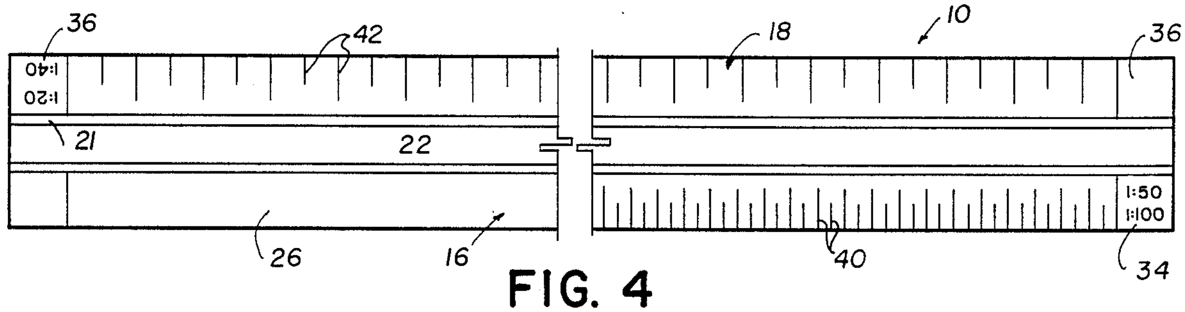
FIG. 4 is a plan view depicting the bottom of the parking scale of the invention as shown in FIG. 2.

Referring to FIGS. 1–4, parking scale 10 is preferably constructed so as to provide a plurality of surfaces 12, 14, 16 and 18 adapted to bear indicia defining increments corresponding directly to the width of adjacent parking spaces on site plans drawn to a specified scale selected from those normally used by architects in preparing such drawings.

Parking scale 10 can be satisfactorily constructed from plastic, wood, fiberglass, metal, or the like. Indicia as exemplified by reference numerals 37, 38, 40 and 42 can be scored into or scribed on surfaces 12, 14, 16 or 18, alternatively, printed on a substrate such as paper or plastic sheet stock that is cut to an appropriate size and thereafter adhesively applied to the respective surfaces. Where parking scale 10 is molded from a plastic material, such indicia can be scored into the mold surface, thereby creating a raised ridge whenever molten plastic material is introduced into the mold.

Figure 2:
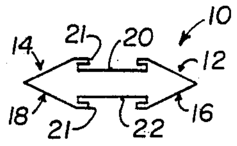
FIG. 2 is a sectional view taken along line 2—2 of FIG. 1.
Figure 1:
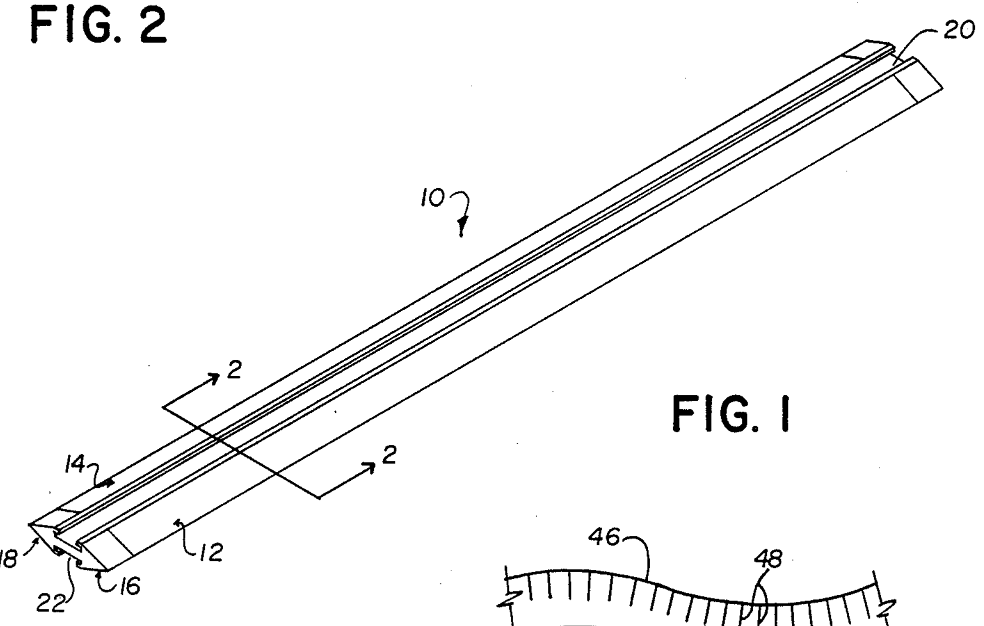
FIG. 1 is a perspective view depicting a preferred embodiment of the parking scale of the invention.

According to one preferred embodiment of the invention, parking scale 10 is made from an extrudable thermoplastic resin that is continuously extruded in a profile such as that depicted in FIGS. 1 and 2, and is thereafter cut to a desired length. Panels corresponding to each of surfaces 12, 14, 16 and 18 bearing indicia as shown in FIGS. 3 and 4, respectively, can then be adhesively applied to said surfaces.

According to another preferred embodiment of the invention, grooves 20, 22 defined by lips 21 are provided so that sign strips bearing company names, logos, proprietary notices, explanatory information and the like can be inserted therein so as to be visible to the user. According to a particularly preferred embodiment of the invention, a thin piece of card stock (not shown) covered by a transparent acetate strip can be inserted into one or both of grooves 20, 22 under lips 21. The strip of card stock utilized in this fashion may contain preprinted notes or spaces for handwritten notes by the user.

Figure 3:
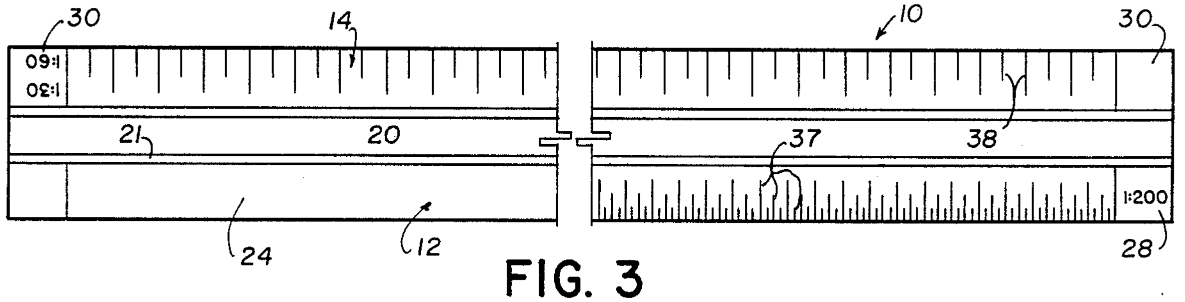
FIG. 3 is a plan view depicting the top of the parking scale of the invention as shown in FIG. 2.

According to a preferred embodiment of the invention, different frequently used scale sizes can be employed in determining the location and spacing of indicia that appear on each of surfaces 12, 14, 16 and 18 as shown in FIGS. 3 and 4. Seven frequently used scale sizes are: one inch equals 200 feet or 1:200; one inch equals 100 feet or 1:100; one inch equals 60 feet or 1:60; one inch equals 50 feet or 1:50; one inch equals 40 feet or 1:40; one inch equals 30 feet or 1:30; and one inch equals 20 feet or 1:20. Referring to FIGS. 3 and 4, each of indicia, 37, 38, 40, 42 corresponds to the width of one conventional nine foot wide parking space when drawn according to a particular scale.

Applicant has discovered that is particularly useful to arrange the scales in such manner that two scales, one of which is double the other, appear on a single surface such as surfaces 12, 14, 16 or 18. Referring to FIG. 3, indicia 38 on surface 14 are intended to correspond directly to the width of conventional parking spaces when drawn at a scale of 1:30 or 1:60, the longer lines representing the increments between parking spaces when drawn at a scale of 1:30 and the shorter lines or indicia, together with the intervening longer lines, representing the increments between parking spaces when drawn art a scale of 1:60. The conventional drawing scale to which each particular scale of indicia corresponds can be identified in spaces 30 provided at each end of surface 14. Although not shown in FIGS. 3 and 4, it is further understood that each individual mark of indicia 38 can be further marked with a sequential numeral so the total number of parking spaces being marked off on a site plan by a user can be quickly determined or cumulated. In a similar manner indicia 42 on surface 18 in FIG. 4 are intended to correspond to parking spaces when drawn at scales of 1:20 or 1:40, with the longer lines representing individual parking spaces when drawn at a scale of 1:20. Spaces 36 are provided at each end of surface 18 for identification of the scales. Indicia 40 on surface 16 at FIG. 4 are intended to correspond to parking spaces when drawn at scales of 1:50 and 1:100 in like manner. Space 34 is provided for identifying the conventional drawing scales corresponding to the indicia 40.

Referring to FIG. 3, indicia 37 are intended to correspond to the width of conventional parking spaces on drawings prepared at a scale of 1:200, which can be shown in the space 28 provided on surface 12. Because of the close spacing between parking spaces when drawn at a scale of 1:200, that scale has been show separately, and the longer lines are utilized to assist in cumulating the total number of parking spaces in groups of twos or fours respectively. Also, as previously disclosed, it is understood that numerals cumulating the total number of parking spaces on the scale can be added to surfaces 12, 14, 16 and 18 in the space above each index line that is nearest lips 21.

Figure 5:
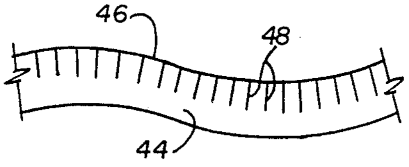
FIG. 5 is a plan view depicting a broken away section of a parking scale having indicia marked along a curvilinear edge.

Finally, referring to FIG. 5, it is understood that this same idea of a parking scale embodying parking scale increments can be incorporated onto a curvilinear surface such as that provided by a flexible curve such as the ship's curve frequently used by architects, planners or engineers. Such a flexible curve 44 must necessarily be constructed so that the spacing of the indicia 48 along the curve 46 being marked or measured is not distorted when fitting the curve.

Although the preferred embodiment of parking scale 10 disclosed herein has four surfaces adapted be scored, inscribed or otherwise marked with indicia corresponding to the width of conventional parking spaces when drawn according to frequently used drawing scales, it will be apparent upon reading this disclosure that parking scales having different cross-sections and different numbers of surfaces and edges can be similarly employed within the scope of the invention. Thus, by way of example, parking scales having triangular cross-sections, with three outwardly facing surfaces and up to six edges, can be used within the scope of the invention. Similarly, parking scales having hexagonal cross-sections and six outward facing surfaces with up to twelve edges bearing indicia corresponding to parking spaces drawn to various scales can be likewise made and used within the scope of the invention.

If desired, portions of some surfaces, such as space 24 on surface 12 as shown in FIG. 3 and space 26 on surface 16 as shown in FIG. 4, can be dedicated to other related purposes such as explanatory notes, messages or decals, proprietary notices, trademarks, logos, corporate names or the like.

The apparatus disclosed herein helps remedy the problem of inaccurate parking space planning, reduces the number of tedious steps required to design and draw conventional parking lots, and reduces the overall time for a parking space planning.

Other obvious alterations and modifications of the invention will become apparent upon reading this disclosure and it is intended to cover all such variations as fall within the scope of the following claims:

What is claimed is:

1. A parking scale comprising a plurality of indicia defining increments corresponding directly to the width of adjacent side-by-side parking spaces when drawn according to a specified drawing scale, wherein said plurality of indicia define increments that directly correspond to the width of conventional parking spaces drawn according to scales selected from the group consisting of one inch equals 200 feet, one inch equals 100 feet, one inch equals 60 feet, one inch equals 50 feet, one inch equals 40 feet, one inch equals 30 feet, and one inch equals 20 feet.

2. A parking scale comprising a plurality of surfaces each bearing at least one set of indicia defining increments that correspond directly to the spacing of conventional automobile parking spaces when drawn to a particular scale, each set of indicia being separately labelled to indicate the scale between the incremental spacing of the indicia and the conventional width of parking spaces.

3. The parking scale of claim 2 wherein one surface comprises at least two distinguishable sets of indicia, each of such sets defining increments that correspond directly to the spacing of conventional automobile parking spaces when drawn to a particular scale different from that of each other set.

* * * * *